United States Patent
Kida et al.

(10) Patent No.: US 11,620,020 B2
(45) Date of Patent: Apr. 4, 2023

(54) TOUCH PANEL BUILT-IN DISPLAY DEVICE AND METHOD OF CONTROLLING TOUCH PANEL BUILT-IN DISPLAY DEVICE TO REDUCE DISPLAY TOUCH INTERFERENCE

(71) Applicant: Sharp Display Technology Corporation, Kameyama (JP)

(72) Inventors: Kazutoshi Kida, Kameyama (JP); Yasuhiro Sugita, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/568,879

(22) Filed: Jan. 5, 2022

(65) Prior Publication Data
US 2022/0236817 A1 Jul. 28, 2022

(30) Foreign Application Priority Data
Jan. 26, 2021 (JP) .............................. JP2021-010362

(51) Int. Cl.
*G06F 3/041* (2006.01)
*G06F 3/044* (2006.01)

(52) U.S. Cl.
CPC .......... *G06F 3/04184* (2019.05); *G06F 3/044* (2013.01); *G06F 3/0412* (2013.01); *G06F 3/04166* (2019.05); *G06F 3/041662* (2019.05); *G06F 3/0446* (2019.05)

(58) Field of Classification Search
CPC .... G06F 3/044; G06F 3/0416; G06F 3/04166; G06F 3/041661; G06F 3/0412; G06F 3/0446; G06F 3/0418; G06F 3/04184; G06F 3/041662
See application file for complete search history.

(56) References Cited

U.S. PATENT DOCUMENTS

| | | | |
|---|---|---|---|
| 8,773,146 B1* | 7/2014 | Hills | G01N 27/22 345/173 |
| 10,146,365 B2* | 12/2018 | Takahashi | G06F 3/04182 |
| 11,182,001 B2* | 11/2021 | Park | G09G 3/20 |
| 2012/0056835 A1 | 3/2012 | Choo et al. | |
| 2014/0132560 A1* | 5/2014 | Huang | G06F 3/041 345/174 |
| 2015/0293642 A1* | 10/2015 | Shepelev | G06F 3/041662 345/174 |
| 2015/0309661 A1* | 10/2015 | Kim | G06F 3/0443 345/174 |
| 2015/0355762 A1* | 12/2015 | Tripathi | H04N 3/24 345/173 |
| 2016/0266694 A1* | 9/2016 | Lee | G06F 3/04166 |
| 2018/0275827 A1* | 9/2018 | Lin | G06F 3/0412 |
| 2021/0216188 A1* | 7/2021 | Cheng | G09G 3/3266 |

FOREIGN PATENT DOCUMENTS

JP 2012-059265 A 3/2012

* cited by examiner

*Primary Examiner* — Darlene M Ritchie
(74) *Attorney, Agent, or Firm* — Keating & Bennett, LLP

(57) ABSTRACT

A display device includes pixel electrode groups and a touch detection driver. During a period, the touch detection driver does not supply touch detection driving signals to a transmitter electrode overlapping in plan view a pixel electrode group to which gate signals are being supplied, and supply touch detection driving signals to a transmitter electrode disposed so as to overlap in plan view a pixel electrode group to which gate signals are not being supplied.

4 Claims, 14 Drawing Sheets

TOUCH PANEL BUILT-IN DISPLAY DEVICE AND METHOD OF CONTROLLING TOUCH PANEL BUILT-IN DISPLAY DEVICE TO REDUCE DISPLAY TOUCH INTERFERENCE

BACKGROUND

1. Field

The present disclosure relates to a touch panel built-in display device and a method of controlling the touch panel built-in display device.

2. Description of the Related Art

In the related art, there are known a touch panel built-in display device including a full in-cell touch panel and a method of controlling the touch panel built-in display device. Such a touch panel built-in display device and a method of controlling the touch panel built-in display device are disclosed in, for example, Japanese Unexamined Patent Application Publication No. 2012-59265.

The touch panel built-in display device in the aforementioned Japanese Unexamined Patent Application Publication No. 2012-59265 includes a touch sensor array, a pixel array, a gate driver, a touch controller, and a timing controller. This timing controller alternatingly executes a display mode in which the pixel array is driven by the gate driver, and a touch sensing mode in which the touch sensor array is driven by the touch controller, in one frame period.

In the touch panel built-in display device described in the aforementioned Japanese Unexamined Patent Application Publication No. 2012-59265, the display mode and the touch sensing mode are alternatingly executed in one frame period. Accordingly, unlike a case of driving the pixel array and the touch sensor array at the same time, a situation in which voltage applied to the touch sensor array affects the pixel array and voltage applied to the pixel array affects the touch sensor array can be avoided. That is to say, effects on display due to touch detection and effects on touch detection due to display can be avoided. However, this entails an inconvenience in that the period of the display mode and the period of the touch sensing mode in one frame period each become shorter. Accordingly, in a case of increasing the number of pixel arrays (raising the definition of the display panel), the period of the display mode will become even shorter per pixel array. Also, in a case of shortening each frame period (increasing the speed of driving), the period of the display mode will become even shorter. Thus, the touch panel built-in display device in the aforementioned Japanese Unexamined Patent Application Publication No. 2012-59265 has an issue in that realizing high definition and high-speed driving of the display panel is difficult.

Accordingly, it is desirable to provide a touch panel built-in display device in which higher definition and faster driving of the panel can be achieved while suppressing effects on display due to touch detection and also effects on touch detection due to display, and a method of controlling such a touch panel built-in display device.

SUMMARY

According to a first aspect of the present disclosure, a touch panel built-in display device includes a plurality of pixel electrode groups, each including a plurality of pixel electrodes, a display driving control unit that sequentially supplies display driving signals to the plurality of pixel electrode groups, a plurality of touch sensor electrodes to which touch detection driving signals are supplied and that are each disposed so as to overlap in plan view at least one of the plurality of pixel electrode groups, a touch detection driving control unit that supplies the touch detection driving signals to the plurality of touch sensor electrodes, and a touch detection signal acquisition unit that acquires touch detection signals from the plurality of touch sensor electrodes. While the display driving signals are being supplied to the plurality of pixel electrode groups, the touch detection driving control unit does not supply the touch detection driving signals to, out of the plurality of touch sensor electrodes, touch sensor electrodes disposed so as to overlap in plan view a pixel electrode group to which the display driving signals are being supplied, and supplies the touch detection driving signals to, out of the plurality of touch sensor electrodes, at least one of the plurality of touch sensor electrodes disposed so as to overlap in plan view a pixel electrode group to which the display driving signals are not being supplied.

According to a second aspect, a method of controlling a touch panel built-in display device including a plurality of pixel electrode groups each including a plurality of pixel electrodes, and a plurality of touch sensor electrodes that are each disposed so as to overlap in plan view at least one of the plurality of pixel electrode groups, includes supplying display driving signals to at least one of the plurality of pixel electrode groups, and while the display driving signals are being supplied to the plurality of pixel electrode groups, not supplying touch detection driving signals to, out of the plurality of touch sensor electrodes, touch sensor electrodes disposed so as to overlap in plan view a pixel electrode group to which the display driving signals are being supplied, and supplying the touch detection driving signals to, out of the plurality of touch sensor electrodes, at least one of the plurality of touch sensor electrodes disposed so as to overlap in plan view a pixel electrode group to which the display driving signals are not being supplied.

DESCRIPTION OF THE EMBODIMENTS

Figure 1:
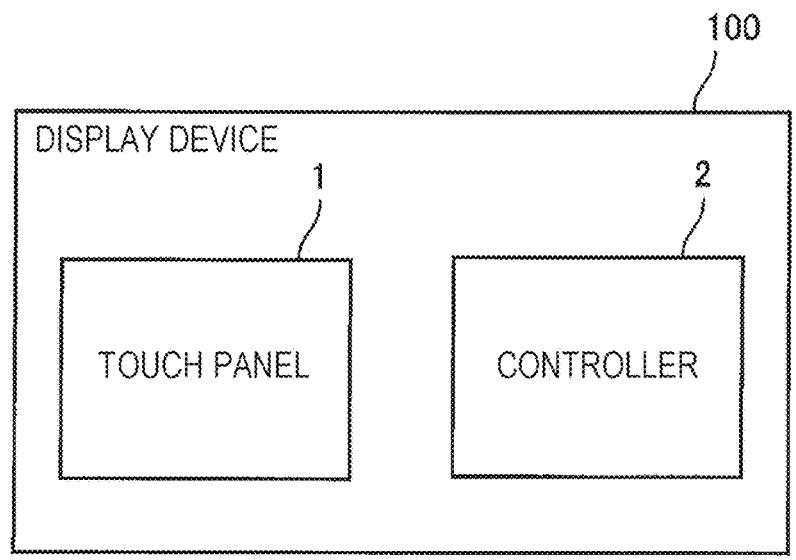
FIG. 1 is a block diagram illustrating a configuration of a display device according to a first embodiment.

Embodiments of the present disclosure will be described in detail below, with reference to the drawings. Portions in the drawings that are the same or equivalent are denoted by the same reference symbols, and description thereof will not be repeated. Note that in the drawings referenced below, configurations may be illustrated in a simplified or schematized manner, and some components may be omitted, to facilitate description. Also, the dimensional ratios among components illustrated in the drawings may not necessarily be to scale. Further, in the drawings referenced blow, various types of electrodes are illustrated with hatching, to facilitate distinguishing among the various types of electrodes.

First Embodiment

A configuration of a touch panel built-in display device 100 (hereinafter referred to as "display device 100") according to a first embodiment will be described with reference to FIG. 1. FIG. 1 is a block diagram illustrating the configuration of the display device 100 according to the first embodiment.

As illustrated in FIG. 1, the display device 100 includes a touch panel 1 and a controller 2. The touch panel 1 is a full in-cell touch panel, for example. The touch panel 1 also functions as a display panel that displays video or images. The controller 2 executes various types of control processing of the display device 100, on the basis of touch positions acquired from the touch panel 1.

Figure 2:
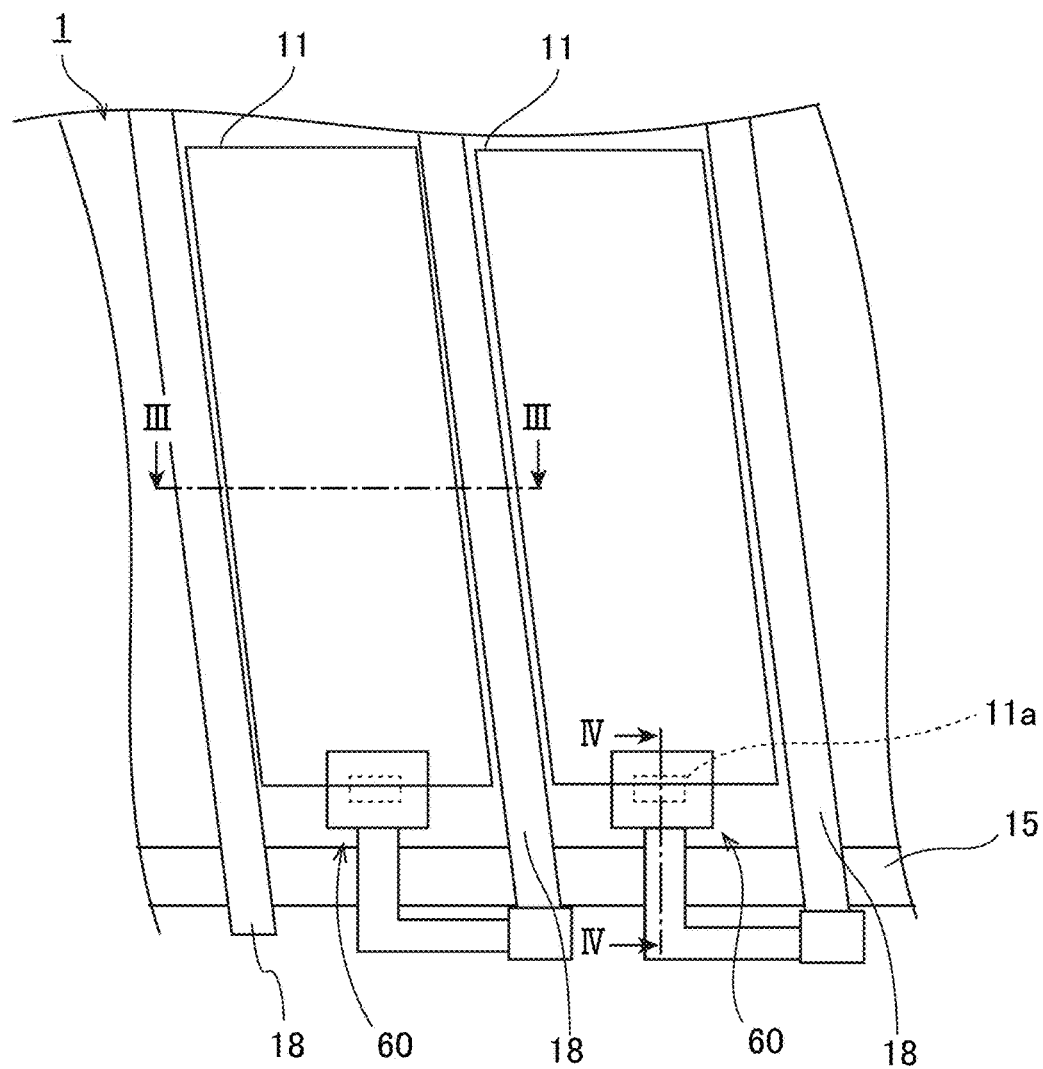
FIG. 2 is a perspective view for describing regions surrounded by source lines and gate lines.
Figure 3:
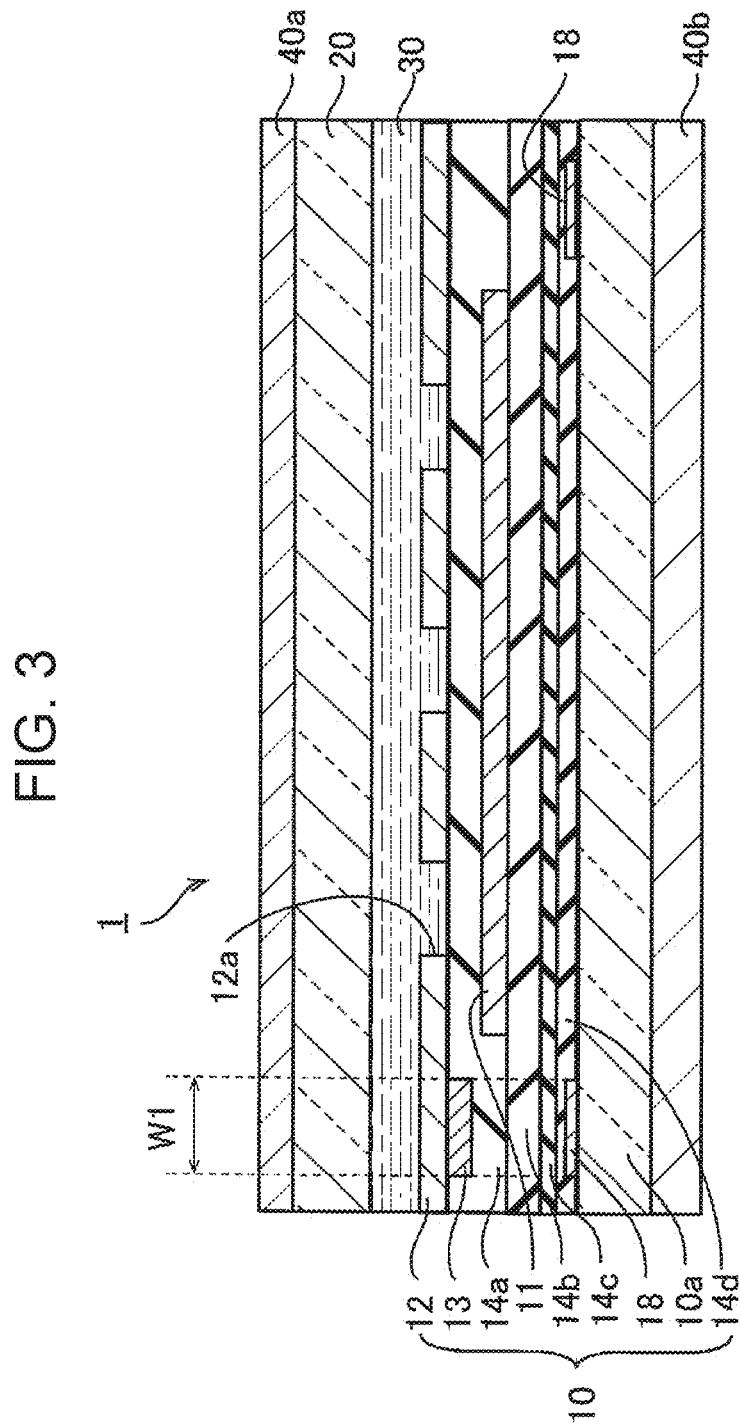
FIG. 3 is a cross-sectional view taken along line III-III in FIG. 2.
Figure 4:
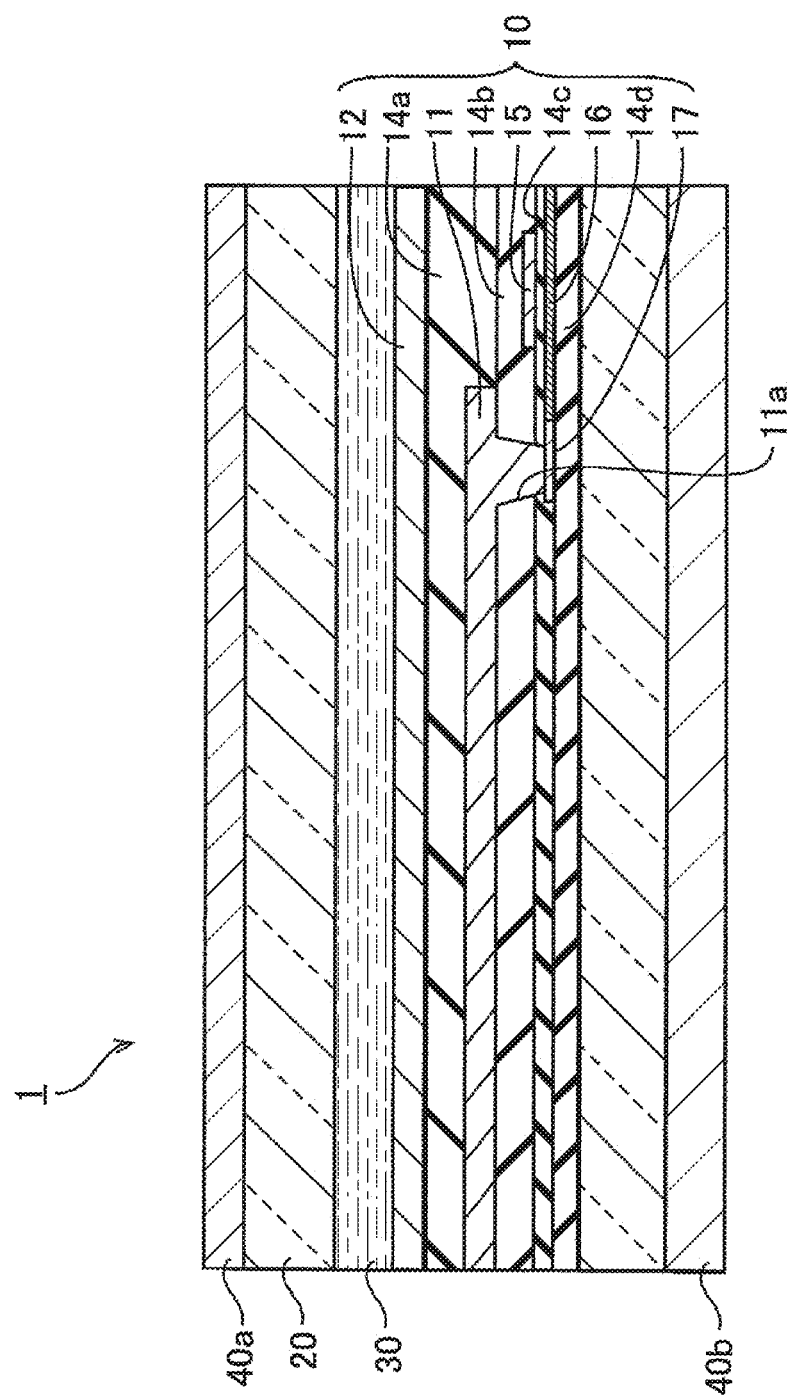
FIG. 4 is a cross-sectional view taken along line IV-IV in FIG. 2.

FIG. 2 is a perspective view schematically illustrating part of the touch panel 1. Also, FIG. 3 is a cross-sectional view taken along line III-III in FIG. 2, and FIG. 4 is a cross-sectional view taken along line IV-IV in FIG. 2. As illustrated in FIG. 3, the touch panel 1 has an active matrix substrate 10, a counter substrate 20, and a liquid crystal layer 30 held between the active matrix substrate 10 and the counter substrate 20. Also a pair of polarizing plates 40a and 40b are disposed with the active matrix substrate 10 and the counter substrate 20 interposed therebetween. A color filter, which is omitted from illustration, is disposed on the counter substrate 20.

For example, a user views images from a front face (hereinafter, "touch face") side of the polarizing plate 40a. The touch panel 1 also accepts touch operations on the touch face by a finger or the like (indicator), for example. Further, the liquid crystal molecules contained in the liquid crystal layer 30 are driven by in-plane switching in the touch panel 1. In order to realize in-plane switching, pixel electrodes 11 and touch sensor electrodes 12 for forming electric fields are formed on the active matrix substrate 10. The touch sensor electrodes 12 function as common electrodes, each of which is disposed opposite a plurality of pixel electrodes 11. The touch sensor electrodes 12 are each shared by a plurality of pixel electrodes 11. Also, a plurality of slits 12a are provided in the touch sensor electrodes 12, as illustrated in FIG. 3.

As illustrated in FIG. 3, the touch sensor electrode 12, a drive line 13, a first insulating layer 14a, the pixel electrode 11, a second insulating layer 14b, a gate line 15 (see FIG. 4), a third insulating layer 14c, a semiconductor layer 16 (see FIG. 4) and a drain electrode 17 (see FIG. 4), a fourth insulating layer 14d, a source line 18, and a glass substrate 10a are disposed in that order from the touch face side, on the active matrix substrate 10. As illustrated in FIG. 3, the touch sensor electrodes 12 are disposed so as to overlap the pixel electrode 11 in plan view. Also, the drive line 13 (touch sensor line) is disposed so as to overlap the source line 18 in plan view. Further, a width W1 of the drive line 13 is substantially the same as the width of the source line 18. Moreover, the drive line 13 is formed so as to extend in parallel with the source line 18. According to this configuration, the dimensions of the touch panel 1 in plan view can be reduced as compared to a case in which a plurality of source lines 18 and a plurality of drive lines 13 are disposed so as to be offset from each other in plan view.

Figure 5:
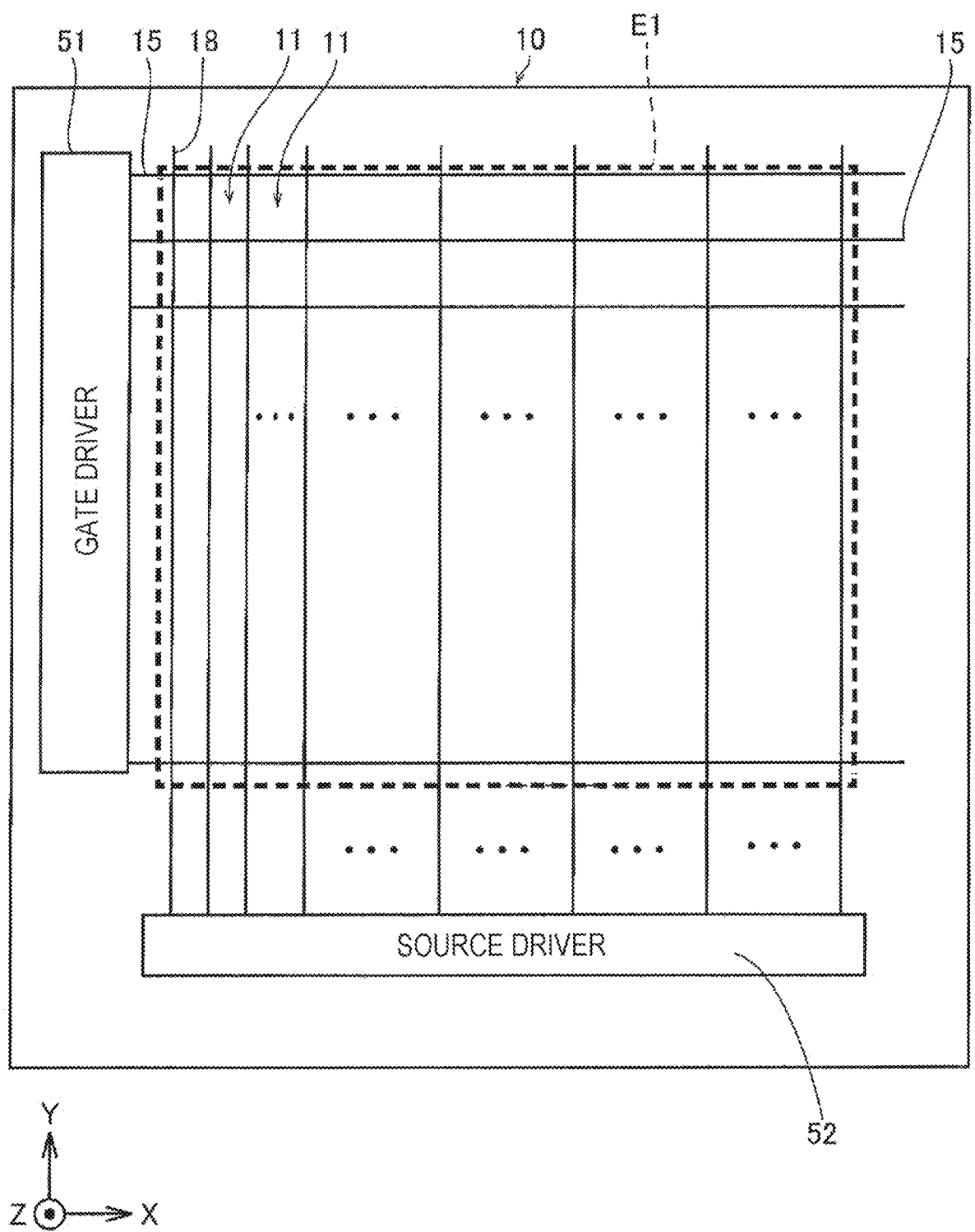
FIG. 5 is a schematic plan view of an active matrix substrate.

FIG. 5 is a plan schematic view for describing connection of a gate driver 51 (gate driving control unit) and a source driver 52 (source driving control unit) with the pixel electrodes 11. The gate driver 51 and the source driver 52 are disposed on the active matrix substrate 10. A plurality of gate lines 15 and a plurality of source lines 18 intersect each other in plan view to form a grid. As illustrated in FIG. 2, thin-film transistors 60 are disposed in regions surrounded by the plurality of gate lines 15 and the plurality of source lines 18.

Figure 6:
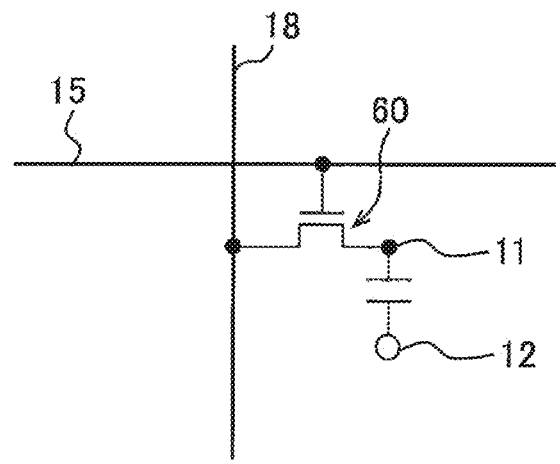
FIG. 6 is a circuit diagram for describing a connection relation of a thin-film transistor with a gate line and a source line.

FIG. 6 is a schematic circuit diagram for describing connection of a thin-film transistor 60 with a gate line 15 and a source line 18. As illustrated in FIG. 6, the gate electrode of the thin-film transistor 60 is connected to the gate line 15, and the source electrode of the thin-film transistor 60 is connected to the source line 18. Also, the drain electrode of the thin-film transistor 60 is connected to the pixel electrode 11 via a contact hole 11a (see FIG. 2). Also, the pixel electrode 11 forms capacitance between itself and the touch sensor electrode 12.

As illustrated in FIG. 5, the plurality of gate lines 15 connect each of the plurality of pixel electrodes 11 with the gate driver 51. Also, the plurality of source lines 18 connect each of the plurality of pixel electrodes 11 with the source driver 52. The gate driver 51 and the source driver 52 are each disposed in a frame region, on the outer side from a display region E1 in which the plurality of pixel electrodes 11 are disposed. The gate driver 51 and the source driver 52 are composed of integrated circuits, for example. The gate driver 51 sequentially supplies gate signals (scanning signals) to each of the plurality of gate lines 15. Specifically, the gate driver 51 sequentially applies voltage to (scans) the plurality of gate line 15 at a predetermined frequency (predetermined refresh rate for display), on the basis of horizontal synchronizing signals from the controller 2. The source driver 52 supplies source signals (data signals) to each of the plurality of source lines 18.

Figure 7:
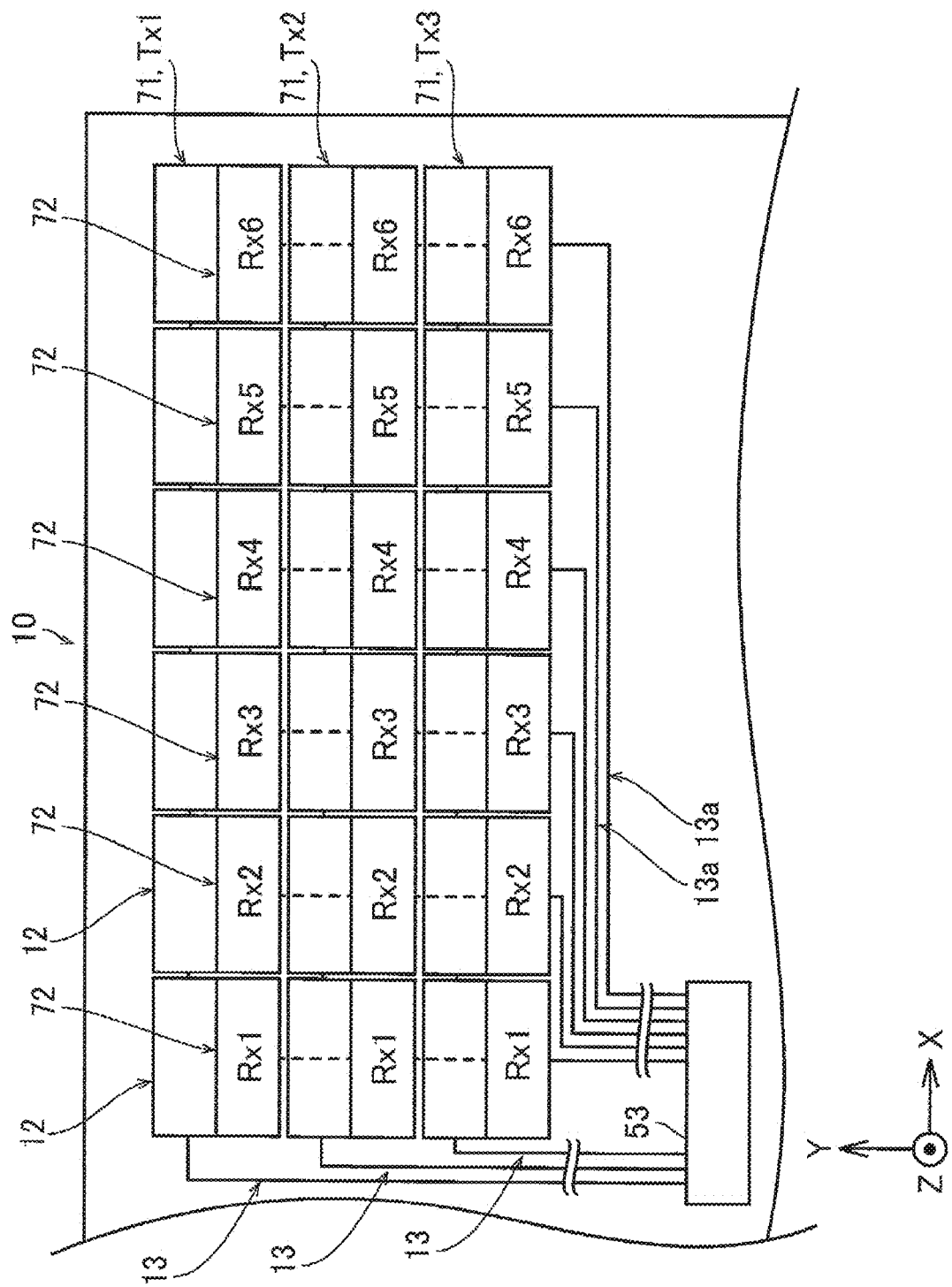
FIG. 7 is a plan view schematically illustrating a configuration of touch sensor electrodes.

FIG. 7 is a plan schematic view for describing a layout relation among the touch sensor electrodes 12, the drive lines 13, and a touch detection driver 53 (touch detection driving control unit and touch position detection control unit). The touch detection driver 53 is disposed on the active matrix substrate 10. The touch detection driver 53 includes an integrated circuit that performs control processing relating to touch detection. The plurality of touch sensor electrodes 12 here may be made up of a plurality of drive electrodes 71 and a plurality of detection electrodes 72. The plurality of drive electrodes 71 may each be a transmitter electrode (Tx) to which touch detection driving signals are supplied. The plurality of detection electrodes 72 are disposed side-by-side in plan view with the plurality of drive electrodes 71, and may form capacitance between themselves and the plurality of drive electrodes 71. The plurality of detection electrodes 72 are each a receiver electrode (Rx) that supplies mutual capacitance detection signals to the touch detection driver 53. The plurality of drive electrodes 71 are connected to each other in a direction in which the gate lines 15 (see FIG. 8) extend (X direction). Note that although FIG. 7 illustrates six drive electrodes 71 and six detection electrodes 72 in the X direction and three drive electrodes 71 and three detection electrodes 72 in the Y direction to facilitate description, the number and layout of the drive electrodes 71 and the detection electrodes 72 are not limited to this.

Now, the drive electrodes 71 will be denoted by Tx1, Tx2, and Tx3 from the Y-direction side, and the detection electrodes 72 will be denoted by Rx1, Rx2, . . . , Rx6 from the opposite side in the X direction. The plurality of Tx1 are connected to each other. One of the plurality of Tx1 is connected to a first drive line 13. The plurality of Tx2 are connected to each other. One of the plurality of Tx2 is connected to a second drive line 13. The plurality of Tx3 are connected to each other. One of the plurality of Tx3 is connected to a third drive line 13.

The plurality of Rx1 may each form mutual capacitance between themselves and Tx1, Tx2, and Tx3. The plurality of Rx1 are connected to each other. One of the plurality of Rx1 is connected to the touch detection driver 53 via a receiver line 13a. Also, Rx2 to Rx6 are similar to Rx1, and accordingly description thereof will be omitted.

Figure 8:
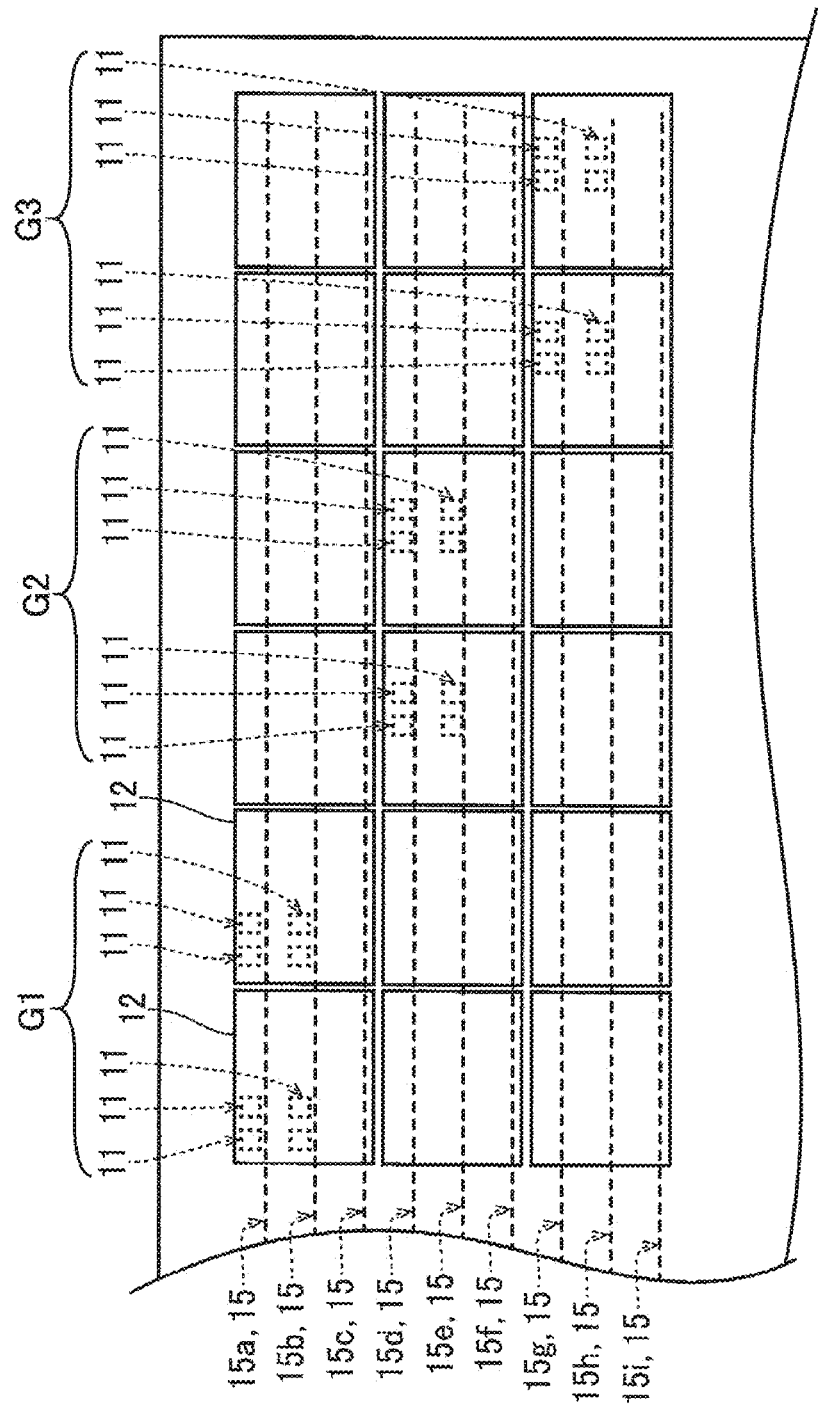
FIG. 8 is a plan view schematically illustrating a layout relation between touch sensor electrodes and pixel electrode groups.

FIG. 8 is a plan schematic diagram for describing the layout relation among the gate lines 15, the pixel electrodes 11, and the touch sensor electrodes 12. Now, the plurality of pixel electrodes 11 disposed so as to overlap in plan view, out of Rx1 to Rx6, the Rx1 to Rx6 forming mutual capacitance between themselves and the Tx1, and the Tx1, are referred to as a pixel electrode group G1. A pixel electrode group G2 and a pixel electrode group G3 are also disposed on the touch panel 1. A gate line 15a, a gate line 15b, and a gate line 15c, for example, are connected to the pixel electrode group G1. A gate line 15d, a gate line 15e, and a gate line 15f, for example, are connected to the pixel electrode group G2. A gate line 15g, a gate line 15h, and a gate line 15i, for example, are connected to the pixel electrode group G3.

Control Method According to First Embodiment

Figure 9:
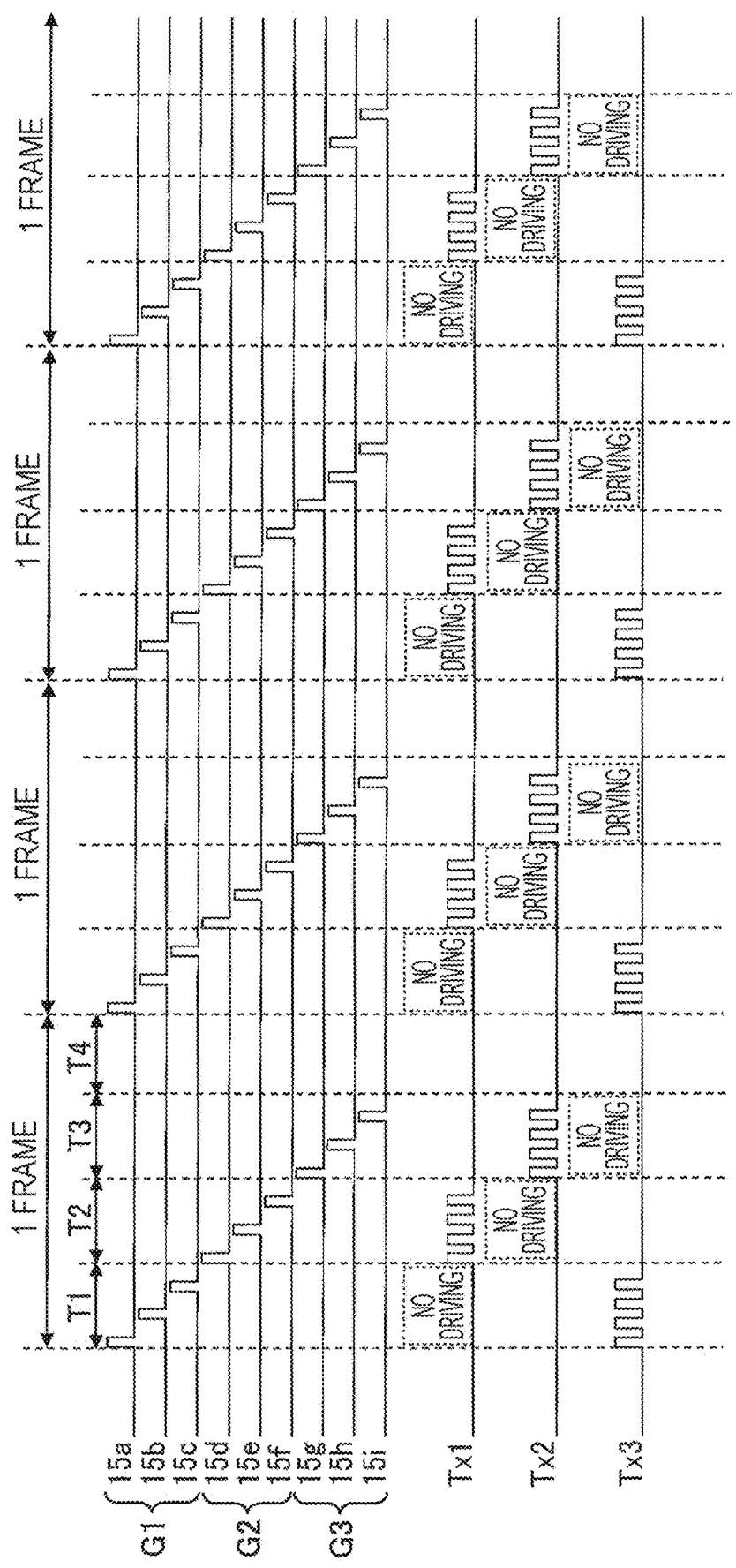
FIG. 9 is a timing chart for describing a method of controlling the display device according to the first embodiment.

A method of controlling the display device 100 according to the first embodiment will be described with reference to FIG. 9. FIG. 9 is a timing chart for describing timings of transmitting gate signals and touch detection driving signals. In a case in which gate signals are being supplied to the pixel electrode group G1 (period T1 in FIG. 9) in the first embodiment, the touch detection driver 53 does not supply touch detection driving signals to the Tx1 disposed so as to overlap the pixel electrode group G1 in plan view, and supplies touch detection driving signals to at least one of the Tx2 and Tx3 (Tx3 in the first embodiment) not overlapping the pixel electrode group G1 in plan view.

Specifically, in the period T1, gate signals are sequentially supplied to the gate lines 15a, 15b, and 15c, whereas touch detection driving signals are not supplied to Tx1. According to this configuration, effects on display due to the touch detection driving signals is suppressed, and also effects on touch detection due to the gate signals can be suppressed. Also, in the period T1 in which gate signals are sequentially supplied to the gate lines 15a, 15b, and 15c, touch detection driving signals are supplied to Tx3, and accordingly driving can be performed at a higher speed (each frame can be shortened) as compared to performing time division of periods for display and periods for touch detection. Also, gate signals can be supplied to a greater number of gate lines 15 per frame as compared to performing time division of periods for display and periods for touch detection, and accordingly the number of gate lines 15 can be increased to increase the definition of the touch panel 1 (display panel). As a result, higher definition and faster driving of the panel can be realized, while suppressing effects on display due to touch detection and also effects on touch detection due to display.

Also, as illustrated in FIG. 9, in a case in which gate signals are being supplied to the pixel electrode group G2 (period T2 in FIG. 9), the touch detection driver 53 does not supply touch detection driving signals to the Tx2 disposed so as to overlap the pixel electrode group G2 in plan view, and supplies touch detection driving signals to at least one of the Tx1 and Tx3 (Tx1 in the first embodiment) not overlapping the pixel electrode group G2 in plan view. Also, in a case in which gate signals are being supplied to the pixel electrode group G3 (period T3 in FIG. 9), the touch detection driver 53 does not supply touch detection driving signals to the Tx3 disposed so as to overlap the pixel electrode group G3 in plan view, and supplies touch detection driving signals to at least one of the Tx1 and Tx2 (Tx2 in the first embodiment) not overlapping the pixel electrode group G3 in plan view. Also, as illustrated in FIG. 9, a period T4, which is a blanking period (non-display period) from completion of transmission of gate signals to all gate lines 15 in each frame (writing to pixel electrodes 11) until starting writing of the next frame, is provided.

As illustrated in FIG. 7, the touch detection driver 53 may acquire touch detection signals including mutual capacitance detection signals from each of Rx1 to Rx6, via the receiver lines 13a. According to this configuration, touch detection by mutual capacitance can be realized by the drive electrodes 71 and the detection electrodes 72. Now, in touch detection by self-capacitance, an increase in capacitance is detected, while in touch detection by mutual capacitance, a decrease in capacitance is detected. Thus, charging is unnecessary in touch detection by mutual capacitance. Consequently, a change in voltage is instantaneously detected in touch detection by mutual capacitance when lines of electric force are cut by touching by an indicator, and accordingly higher sensitivity and higher response speed can be realized at the same time as compared to touch detection by self-capacitance.

Also, in the first embodiment, touch detection driving signals are supplied to all of Tx1 to Tx3 at the point in time at which the period T3 ends, and accordingly the touch detection driver 53 is capable of acquiring mutual capacitance detection signals from all of Rx1 to Rx6 at the point in time at which the period T3 ends. Accordingly, the touch detection driver 53 acquires the touch position and outputs the acquired touch position to the controller 2 at a point in time (point in time of ending the period T3) earlier than the point in time of refreshing of the pixel electrode groups G1 to G3 (point in time of ending of the period T4). Specifically, the touch detection driver 53 acquires the touch position by the indicator on the basis of the touch detection signal (mutual capacitance detection signal) acquired from each of Rx1 to Rx6, and outputs the acquired touch position to the controller 2. According to this configuration, the touch position can be output at a point in time earlier than the screen being refreshed, and accordingly touching can be detected more quickly.

Second Embodiment

Next, a configuration of a touch panel built-in display device 200 (hereinafter referred to as "display device 200") according to a second embodiment will be described with reference to FIGS. 10 and 11. The display device 200 according to the second embodiment supplies self-capacitance detection driving signals to each of the plurality of drive electrodes 71 and the plurality of detection electrodes 72 in the period T4 that is the non-display period. Note that in the following description, reference symbols that are the same as those in the first embodiment indicate components that are the same as those in the first embodiment, and the preceding description is to be referenced unless particular description is provided otherwise.

Configuration of Display Device According to Second Embodiment

Figure 10:
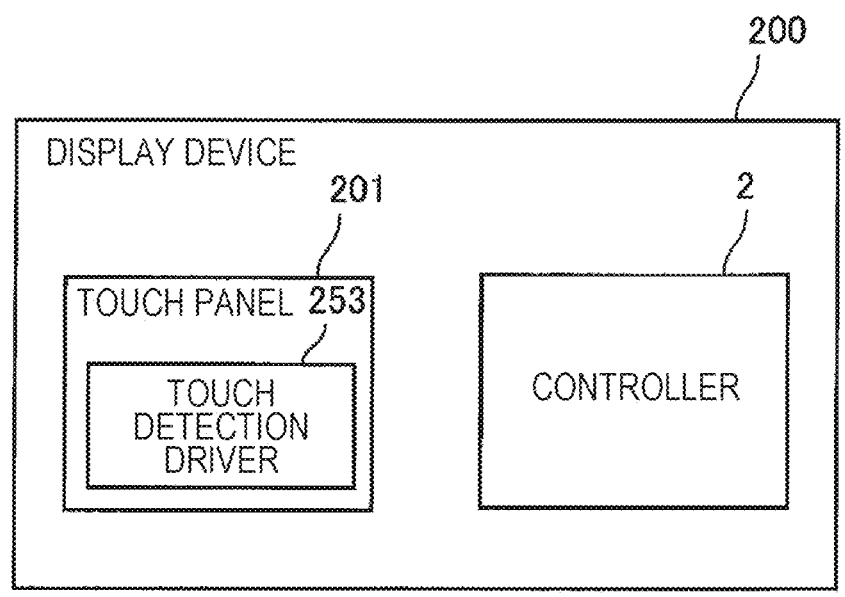
FIG. 10 is a block diagram illustrating a configuration of a display device according to a second embodiment.

FIG. 10 is a block diagram of the display device 200. The display device 200 includes a touch panel 201 in which a touch detection driver 253 is provided, and the controller 2. Note that other components of the display device 200 according to the second embodiment are the same as those of the display device 100 according to the first embodiment.

Method of Controlling Display Device According to Second Embodiment

Figure 11:
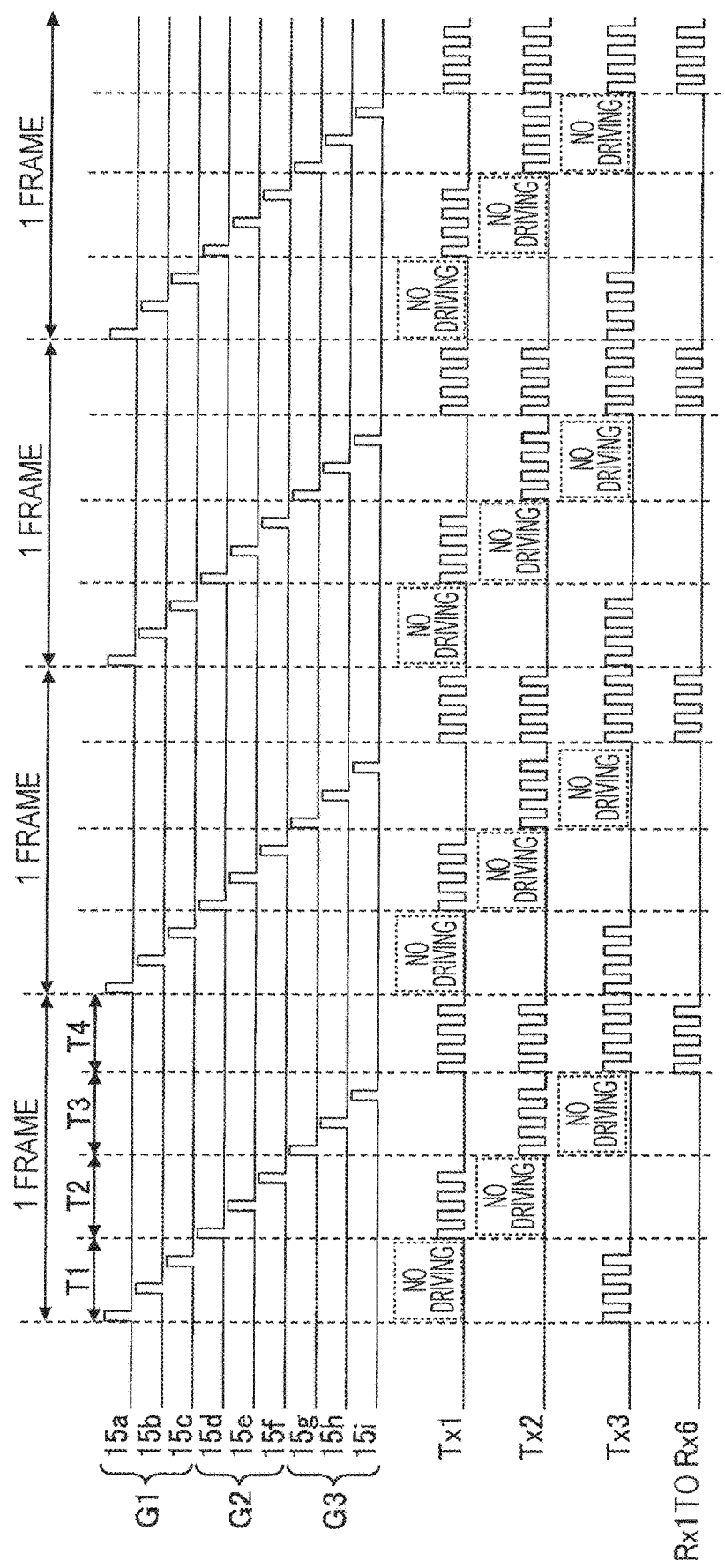
FIG. 11 is a timing chart for describing a method of controlling the display device according to the second embodiment.

FIG. 11 is a timing chart for describing timings of transmitting gate signals and touch detection driving signals in the display device 200 according to the second embodiment. The touch detection driver 253 may supply self-capacitance detection driving signals to each of Tx1 to Tx3 and Rx1 to Rx6 in the period T4 in which gate signals are not supplied to any of the plurality of pixel electrode groups (G1, G2, and G3). For example, the touch detection driver 253 supplies self-capacitance detection driving signals to Tx1 to Tx3 via the drive lines 13, and supplies self-capacitance detection driving signals to Rx1 to Rx6 via the receiver lines 13a. The touch detection driver 253 then may acquire touch detection signals including self-capacitance detection signals from Tx1 to Tx3 and Rx1 to Rx6. That is to say, in the display device 200 according to the second embodiment, touch detection by mutual capacitance is performed in the periods T1 to T3, and touch detection by self-capacitance is performed in the period 14.

The configuration and control method according to the second embodiment enables touch detection by self-capacitance in addition to touch detection by mutual capacitance. Now, in touch detection by self-capacitance, capacitance is not detected in a case in which water droplets adhere to the touch panel 201, and accordingly, water droplets can correctly be determined as not being touches by self-capacitance, even in a case in which a change in mutual capacitance is detected due to water droplets in the above touch detection by mutual capacitance. Further, self-capacitance detection driving signals are supplied to each of the plurality of drive electrodes 71 and the plurality of detection electrodes 72 in the period 14 in which no gate signals are being supplied to any of the plurality of pixel electrode groups (G1, G2, and G3), and accordingly self-capacitance detection driving signals can be suppressed from affecting display. Note that otherwise, the control method and effects of the display device 200 according to the second embodiment are the same as the control method and effects of the display device 100 according to the first embodiment.

Third Embodiment

Next, a configuration of a touch panel built-in display device 300 (hereinafter referred to as "display device 300") according to a third embodiment will be described with reference to FIGS. 12 and 13. In the display device 300 according to the third embodiment, a touch detection driver 353 also supplies touch detection driving signals to Tx2, in addition to Tx3 in the period T1 (i.e., performs parallel processing). Note that in the following description, reference symbols that are the same as those in the first and second embodiments indicate components that are the same as those in the first and second embodiments, and the preceding description is to be referenced unless particular description is provided otherwise.

Configuration of Display Device According to Third Embodiment

Figure 12:
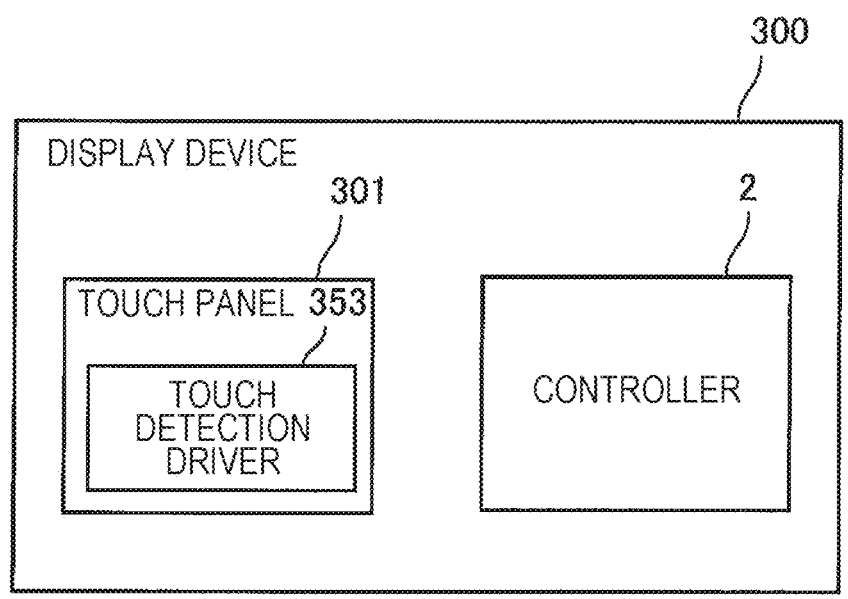
FIG. 12 is a block diagram illustrating a configuration of a display device according to a third embodiment.

FIG. 12 is a block diagram of the display device 300. The display device 300 includes a touch panel 301 in which the touch detection driver 353 is provided, and the controller 2. Note that other components of the display device 300 according to the third embodiment are the same as those of the display device 100 according to the first embodiment.

Method of Controlling Display Device According to Third Embodiment

Figure 13:
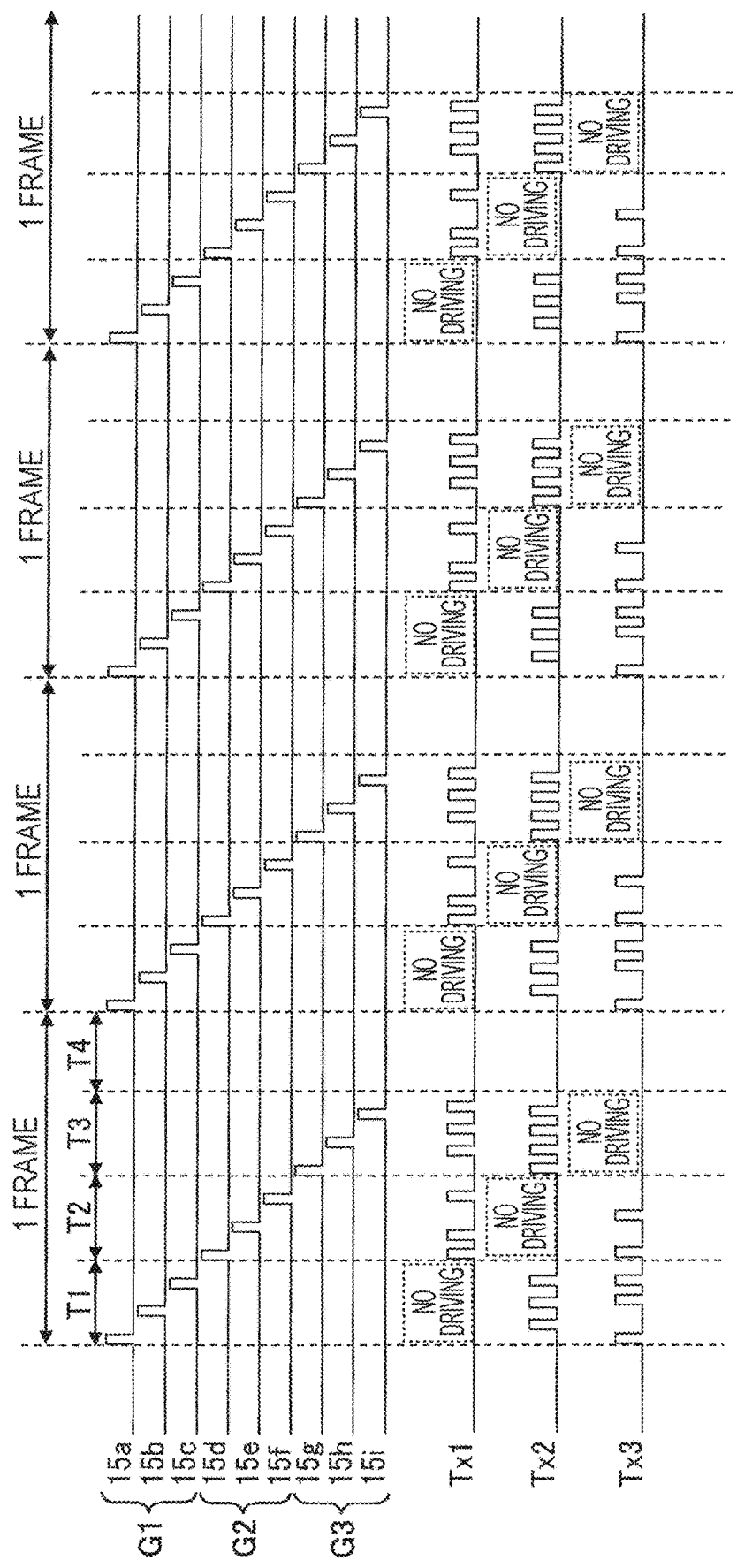
FIG. 13 is a timing chart for describing a method of controlling the display device according to the third embodiment.

FIG. 13 is a timing chart for describing timings of transmitting gate signals and touch detection driving signals in the display device 300 according to the third embodiment. In the period T1, the touch detection driver 353 supplies touch detection driving signals to Tx2, in addition to supplying touch detection driving signals to Tx3. Also, in the period T2, the touch detection driver 353 supplies touch detection driving signals to Tx3, in addition to supplying touch detection driving signals to Tx1. In the period T3, the touch detection driver 353 supplies touch detection driving signals to Tx1, in addition to supplying touch detection driving signals to Tx2. In other words, touch detection driving signals are supplied to Tx1 in periods other than the periods T1 and T4, touch detection driving signals are supplied to Tx2 in periods other than the periods T2 and T4, and touch detection driving signals are supplied to Tx3 in periods other than the periods T3 and T4. Thus, in the display device 300, touch detection driving signals are supplied to Tx1 to Tx3 for a greater number of times as compared to the display device 100 according to the first embodiment.

Also, as illustrated in FIG. 13, the touch detection driver 353 supplies touch detection driving signals at different cycles from each other, or supplies touch detection driving signals at different timings from each other, to a plurality of Tx that receive supply in the same period, out of Tx1 to Tx3. For example, the cycle of touch detection driving signals supplied to Tx3 is longer than the cycle of touch detection driving signals supplied to Tx2 in the period T1. Also, the timing of supplying touch detection driving signals to Tx1 in the period T2 is different from the timing of supplying touch detection driving signals to Tx3.

The touch detection driver 353 then acquires touch detection signals from each of Rx1 to Rx6, and decodes the touch detection signals on the basis of the aforementioned cycle or timing, thereby detecting the touch position.

According to the configuration and control method of the third embodiment, touch detection driving signals can be supplied to not only one Tx (e.g., Tx2), but also to another Tx (e.g., Tx3), during the same period. That is to say, Tx2 and Tx3 can be driven in parallel (parallel processing). As a result, touch detection driving signals can be supplied multiple times to the touch sensor electrodes 12 in a period in which gate signals are sequentially supplied to all pixel electrode groups G1 to G3 (in one frame period). Accordingly, the sensitivity of touch detection can be improved. That is to say, in a case in which the number of Tx is n (a natural number of 3 or more), touch detection is performed once for each Tx per frame in the first embodiment, but touch detection can be performed n-1 times (twice or more) for each Tx per frame in the third embodiment. Note that otherwise, the control method and effects of the display device 300 according to the third embodiment are the same as the control method and effects of the display device 100 according to the first embodiment.

Fourth Embodiment

Next, a configuration of a touch panel built-in display device 400 (hereinafter referred to as "display device 400") according to a fourth embodiment will be described with reference to FIGS. 14 and 15. In the display device 400 according to the fourth embodiment, a touch detection driver 453 supplies touch detection driving signals to Tx2 in addition to Tx3 in the period T1 (i.e., performs parallel processing), and also supplies self-capacitance detection driving signals to each of the plurality of drive electrodes 71 and the plurality of detection electrodes 72 in the period 14. That is to say, the touch detection driver 453 of the display device 400 according to the fourth embodiment has the functions of both the touch detection driver 253 according to the second embodiment and the touch detection driver 353 according to the third embodiment. Note that in the following description, reference symbols that are the same as those in the first to third embodiments indicate components that are the same as those in the first to third embodiments, and the preceding description is to be referenced unless particular description is provided otherwise.

Configuration of Display Device According to Fourth Embodiment

Figure 14:
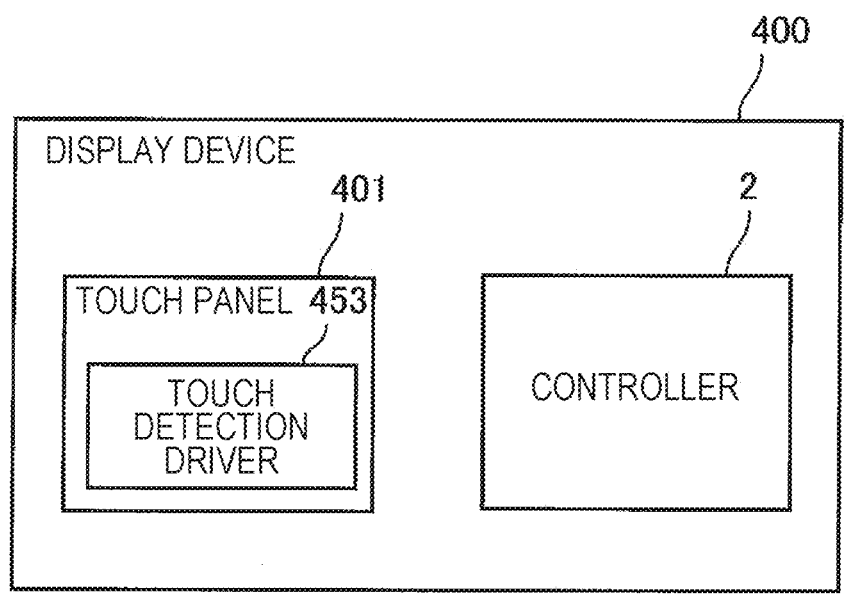
FIG. 14 is a block diagram illustrating a configuration of a display device according to a fourth embodiment.

FIG. 14 is a block diagram of the display device 400. The display device 400 includes a touch panel 401 in which the touch detection driver 453 is provided, and the controller 2. Note that other components of the display device 400 according to the fourth embodiment are the same as those of the display device 100 according to the first embodiment.

Method of Controlling Display Device According to Fourth Embodiment

Figure 15:
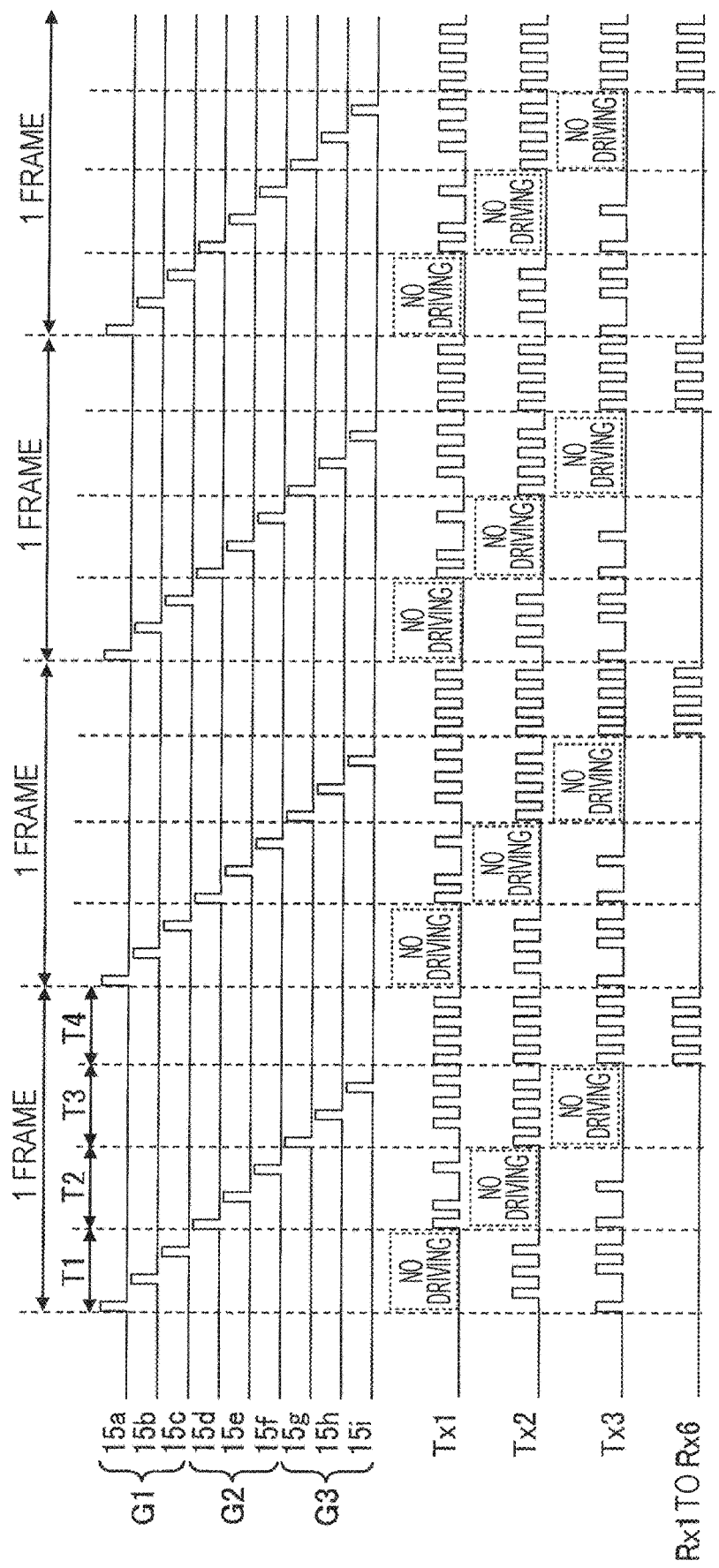
FIG. 15 is a timing chart for describing a method of controlling the display device according to the fourth embodiment.

FIG. 15 is a timing chart for describing timings of transmitting gate signals and touch detection driving signals in the display device 400 according to the fourth embodiment. The method of controlling the display device 400 in the periods T1 to T3 is the same as the method of controlling the display device 300 according to the above third embodiment, and the method of controlling the display device 400 in the period T4 is the same as the method of controlling the display device 200 according to the above second embodiment. According to the configuration and control method of the fourth embodiment, water droplets can correctly be determined by self-capacitance as not being touches even in a case in which a change in mutual capacitance is detected due to water droplets as in the above second embodiment, while improving the sensitivity of touch detection as in the above third embodiment. Note that otherwise, the control method and effects of the display device 400 according to the fourth embodiment are the same as the control method and effects of the display device 100 according to the first embodiment.

Modifications

The above-described embodiments are only exemplifications of carrying out the present disclosure. Accordingly, the present disclosure is not limited to the above-described embodiments, and the above-described embodiments can be carried out with appropriate modifications without departing from the spirit thereof.

For example, an example is shown in the above first embodiment in which the touch sensor electrodes 12 include the drive electrodes 71 and the detection electrodes 72, and touch detection is performed by mutual capacitance, but the present disclosure is not limited to this. That is to say, touch detection by self-capacitance may be performed using touch sensor electrodes, without performing touch detection by mutual capacitance.

Also, an example is shown in the above first to fourth embodiments in which the touch sensor electrodes 12 are formed as rectangles in plan view, but the present disclosure is not limited to this. For example, the touch sensor electrodes 12 may be formed as diamond patterns (rhombi).

Also, an example is shown in the above first to fourth embodiments in which the touch position is output at a point in time (upon the period T3 ending) earlier than the point in time at which the plurality of pixel electrode groups G1 to G3 are refreshed (upon the period 14 ending), but the present disclosure is not limited to this. For example, the touch position may be output at the same point in time at which the plurality of pixel electrode groups G1 to G3 are refreshed.

Also, an example is shown in the above first to fourth embodiments in which any one of the plurality of source lines 18 and the drive lines 13 overlap in plan view, but the present disclosure is not limited to this. That is to say, the plurality of source lines 18 and the drive lines 13 may be disposed at positions that do not overlap in plan view.

Also, the touch panel built-in display devices and the methods of controlling the touch panel built-in display device described above may be described as follows.

A touch panel built-in display device according to a first configuration includes a plurality of pixel electrode groups, each including a plurality of pixel electrodes, a display driving control unit that sequentially supplies display driving signals to the plurality of pixel electrode groups, a plurality of touch sensor electrodes to which touch detection driving signals are supplied and that are each disposed so as to overlap in plan view at least one of the plurality of pixel electrode groups, a touch detection driving control unit that supplies the touch detection driving signals to the plurality of touch sensor electrodes, and a touch detection signal acquisition unit that acquires touch detection signals from the plurality of touch sensor electrodes. While the display driving signals are being supplied to the plurality of pixel electrode groups, the touch detection driving control unit does not supply the touch detection driving signals to, out of the plurality of touch sensor electrodes, touch sensor electrodes disposed so as to overlap in plan view a pixel electrode group to which the display driving signals are being supplied, and supplies the touch detection driving signals to, out of the plurality of touch sensor electrodes, at least one of the plurality of touch sensor electrodes disposed so as to overlap in plan view a pixel electrode group to which the display driving signals are not being supplied (first configuration).

According to the above first configuration, touch detection driving signals are not supplied to touch sensor electrodes disposed so as to overlap in plan view a pixel electrode group to which the display driving signals are being supplied, and accordingly touch detection driving signals can be suppressed from affecting display. Also, touch detection driving signals are supplied to touch sensor electrodes disposed so as to overlap in plan view a pixel electrode group to which the display driving signals are not being supplied, and accordingly display driving signals can be suppressed from affecting touch detection. Touch detection driving signals can be supplied to touch sensor electrodes overlapping in plan view a pixel electrode group to which the display driving signals are not being supplied in a period in which display driving signals are being supplied to the pixel electrode groups, and accordingly speed of driving the pixel electrodes and the touch sensor electrodes can be increased as compared to a case of carrying out a period of supplying display driving signals to the pixel electrode groups (display period) and a period of supplying touch detection driving signals to the touch sensor electrodes (touch detection period) in time division. Also, display driving signals can be supplied to a greater number of pixel electrode groups per frame as compared to a case of carrying out the display period and touch detection period in time division, and accordingly the number of pixel electrode groups can be increased and the definition of the panel (display panel) can be increased. As a result thereof, definition and driving speed of the panel can be increased, while suppressing effects of touch detection on display and effects of display on touch detection.

In the first configuration, the plurality of touch sensor electrodes may include a plurality of drive electrodes to which the touch detection driving signals are supplied and that are each disposed so as to overlap in plan view at least one of the plurality of pixel electrode groups, and a plurality of detection electrodes that form capacitance between the detection electrodes and the plurality of drive electrodes, and the touch detection signal acquisition unit may be configured to acquire touch detection signals that include mutual capacitance detection signals from the plurality of detection electrodes (second configuration).

According to the above second configuration, touch detection by mutual capacitance can be performed by drive electrodes and detection electrodes. Now, in touch detection by self-capacitance, an increase in capacitance is detected, while in touch detection by mutual capacitance, a decrease in capacitance is detected. Thus, charging is unnecessary in touch detection by mutual capacitance. Consequently, a change in voltage is instantaneously detected in touch detection by mutual capacitance when lines of electric force are cut by touching by an indicator, and accordingly high sensitivity and high response speed can be realized at the same time.

In the second configuration, the touch detection driving control unit may be configured to supply self-capacitance detection driving signals to each of the plurality of drive electrodes and the plurality of detection electrodes, in a period in which the display driving signals are not being supplied to any of the plurality of pixel electrode groups, and the touch detection signal acquisition unit may be configured to acquire touch detection signals that include self-capacitance detection signals from the plurality of drive electrodes and the plurality of detection electrodes (third configuration).

According to the above third configuration, touch detection by self-capacitance is enabled in addition to touch detection by mutual capacitance. Now, in touch detection by self-capacitance, capacitance is not detected in a case in which water droplets adhere to the touch panel, and accordingly, water droplets can correctly be determined as not being touches by self-capacitance, even in a case in which a change in mutual capacitance is detected due to water droplets in the above touch detection by mutual capacitance. Further, self-capacitance detection driving signals are supplied to each of the plurality of drive electrodes and the plurality of detection electrodes in a period in which no display driving signals are being supplied to any of the plurality of pixel electrode groups, and accordingly self-capacitance detection driving signals can be suppressed from affecting display.

In any one of the first to third configurations, the touch panel built-in display device may further include a touch position detection control unit that outputs a touch position by an indicator, on the basis of the touch detection signals acquired from each of the plurality of touch sensor electrodes, the display driving control unit may be configured to sequentially supply the display driving signals to the plurality of pixel electrode groups at a refresh rate for display, and the touch position detection control unit may be configured to output the touch position at a point in time earlier than a point in time of the plurality of pixel electrode groups being refreshed (fourth configuration).

According to the fourth configuration, the touch position can be output at a point in time earlier than the screen being refreshed, and accordingly touching can be detected more quickly.

In any one of the first to fourth configurations, the touch panel built-in display device may further include a source driving control unit that supplies source signals to each of the plurality of pixel electrode groups, a plurality of source lines connecting each of the plurality of pixel electrode groups and the source driving control unit, and a plurality of touch sensor lines that connect the plurality of touch sensor electrodes and the touch detection driving control unit, and that are disposed so as to overlap in plan view any one of the plurality of source lines (fifth configuration).

According to the fifth configuration, the dimensions of the touch panel in plan view can be reduced as compared to a case in which a plurality of source lines and a plurality of touch sensor lines are disposed so as to be offset from each other in plan view.

Any one of the first to fifth configurations may be configured such that, while the display driving signals are being supplied to the plurality of pixel electrode groups, the touch detection driving control unit does not supply the touch detection driving signals to, out of the plurality of touch sensor electrodes, touch sensor electrodes disposed so as to overlap in plan view a pixel electrode group to which the display driving signals are being supplied, and supplies the touch detection driving signals to, out of the plurality of touch sensor electrodes, a plurality of touch sensor electrodes each disposed so as to overlap in plan view a plurality of pixel electrode groups to which the display driving signals are not being supplied (sixth configuration).

According to the above sixth configuration, touch detection driving signals can be supplied to a plurality of touch sensor electrodes each overlapping a plurality of pixel electrode groups to which display driving signals are not being supplied, in the same period. That is to say, a plurality of touch sensor electrodes can be driven in parallel (parallel processing). As a result, touch detection driving signals can be supplied multiple times to the touch sensor electrodes in a period in which display driving signals are sequentially supplied to all pixel electrode groups (in one frame period). Accordingly, the sensitivity of touch detection can be improved.

A method of controlling a touch panel built-in display device according to a seventh configuration is a method of controlling a touch panel built-in display device including a plurality of pixel electrode groups each including a plurality of pixel electrodes, and a plurality of touch sensor electrodes that are each disposed so as to overlap in plan view at least one of the plurality of pixel electrode groups. The method includes supplying display driving signals to at least one of the plurality of pixel electrode groups, and while the display driving signals are being supplied to the plurality of pixel electrode groups, not supplying touch detection driving signals to, out of the plurality of touch sensor electrodes, touch sensor electrodes disposed so as to overlap in plan view a pixel electrode group to which the display driving signals are being supplied, and supplying the touch detection driving signals to, out of the plurality of touch sensor electrodes, at least one of the plurality of touch sensor electrodes disposed so as to overlap in plan view a pixel electrode group to which the display driving signals are not being supplied (seventh configuration).

According to the seventh configuration, a method of controlling a touch panel built-in display device can be provided in which higher definition and faster driving of the panel can be realized, while suppressing effects on display due to touch detection and also effects on touch detection due to display, in the same way as with the above first configuration.

The present disclosure contains subject matter related to that disclosed in Japanese Priority Patent Application JP 2021-010362 filed in the Japan Patent Office on Jan. 26, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel built-in display device, comprising:
    a plurality of pixel electrode groups, each including a plurality of pixel electrodes;
    a display driving control unit that sequentially supplies display driving signals to the plurality of pixel electrode groups;
    a plurality of touch sensor electrodes to which touch detection driving signals are supplied and that are each disposed so as to overlap in a plan view at least one of the plurality of pixel electrode groups;
    a touch detection driving control unit that supplies the touch detection driving signals to the plurality of touch sensor electrodes; and
    a touch detection signal acquisition unit that acquires touch detection signals from the plurality of touch sensor electrodes,
    wherein, the plurality of pixel electrode groups include a first pixel electrode group, a second pixel electrode group, and a third pixel electrode group,
    the plurality of touch sensor electrodes include a first touch sensor electrode that is disposed so as to overlap in the plan view the first pixel electrode group, a second touch sensor electrode that is disposed so as to overlap in the plan view the second pixel electrode group, and a third touch sensor electrode that is disposed so as to overlap in the plan view the third pixel electrode group,
    while the display driving signals are being supplied to the first pixel electrode group, the touch detection driving control unit does not supply the touch detection driving signals to the first touch sensor electrode, and supplies the touch detection driving signals to the second touch sensor electrode and the third touch sensor electrode,
    the plurality of touch sensor electrodes include,
        a plurality of drive electrodes to which the touch detection driving signals are supplied and that are each disposed so as to overlap in plan view at least one of the plurality of pixel electrode groups, and
        a plurality of detection electrodes that form capacitance between the detection electrodes and the plurality of drive electrodes,
    the touch detection signal acquisition unit acquires touch detection signals that include mutual capacitance detection signals from the plurality of detection electrodes,
    the touch detection driving control unit supplies self-capacitance detection driving signals to each of the plurality of drive electrodes and the plurality of detection electrodes, in a period in which the display driving signals are not being supplied to any of the plurality of pixel electrode groups, and
    the touch detection signal acquisition unit acquires touch detection signals that include self-capacitance detection signals from the plurality of drive electrodes and the plurality of detection electrodes.

2. The touch panel built-in display device according to claim 1, further comprising:
    a touch position detection control unit that outputs a touch position by an indicator, on the basis of the touch detection signals acquired from each of the plurality of touch sensor electrodes,
    wherein the display driving control unit sequentially supplies the display driving signals to the plurality of pixel electrode groups at a refresh rate for display, and
    wherein the touch position detection control unit outputs the touch position at a point in time earlier than a point in time of the plurality of pixel electrode groups being refreshed.

3. The touch panel built-in display device according to claim 1, further comprising:
    a source driving control unit that supplies source signals to each of the plurality of pixel electrode groups;
    a plurality of source lines connecting each of the plurality of pixel electrode groups and the source driving control unit; and
    a plurality of touch sensor lines that connect the plurality of touch sensor electrodes and the touch detection driving control unit, and that are disposed so as to overlap in plan view any one of the plurality of source lines.

4. A method of controlling a touch panel built-in display device including a plurality of pixel electrode groups each including a plurality of pixel electrodes, and a plurality of touch sensor electrodes that are each disposed so as to overlap in a plan view at least one of the plurality of pixel electrode groups,
    wherein the plurality of pixel electrode groups include a first pixel electrode group, a second pixel electrode group, and a third pixel electrode group, and
    the plurality of touch sensor electrodes include a first touch sensor electrode that is disposed so as to overlap in the plan view the first pixel electrode group, a second touch sensor electrode that is disposed so as to overlap in the plan view the second pixel electrode group, and a third touch sensor electrode that is disposed so as to overlap in the plan view the third pixel electrode group, the method comprising:

supplying display driving signals to at least one of the plurality of pixel electrode groups; and while the display driving signals are being supplied to the first pixel electrode group, not supplying touch detection driving signals to the first touch sensor electrode, and supplying the touch detection driving signals to the second touch sensor electrode and the third touch sensor electrode, wherein the plurality of touch sensor electrodes include a plurality of drive electrodes to which the touch detection driving signals are supplied and that are each disposed so as to overlap in plan view at least one of the plurality of pixel electrode groups, and a plurality of detection electrodes that form capacitance between the detection electrodes and the plurality of drive electrodes, and the method further comprises:

acquiring touch detection signals that include mutual capacitance detection signals from the plurality of detection electrodes, supplying self-capacitance detection driving signals to each of the plurality of drive electrodes and the plurality of detection electrodes, in a period in which the display driving signals are not being supplied to any of the plurality of pixel electrode groups, and acquiring touch detection signals that include self-capacitance detection signals from the plurality of drive electrodes and the plurality of detection electrodes.

* * * * *